Feb. 14, 1928.
J. HARRIS
1,659,429
INDUCTION ELECTRICITY METER
Filed June 15, 1925
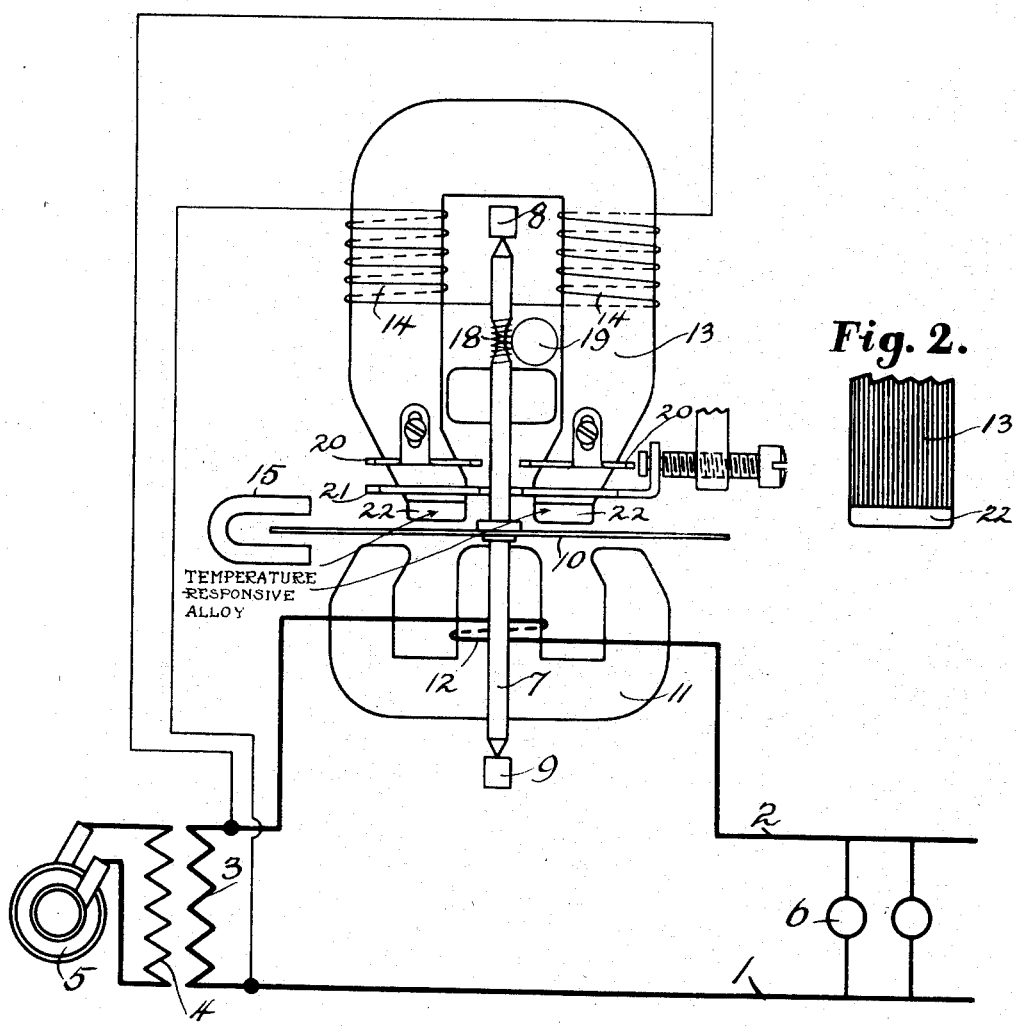
INVENTOR
Jesse Harris
BY
ATTORNEY Patented Feb. 14, 1928.

1,659,429

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

INDUCTION ELECTRICITY METER.

Application filed June 15, 1925. Serial No. 37,172.

My invention relates to induction electricity meters and is of particular service in connection with watthour meters.

My invention has for its object the prevention of errors in such a meter due to temperature changes. I accomplish the object of my invention by the provision of temperature controlled reluctance members encountered by flux set up by the torque producing magnet system of the meter. This variable reluctance may serve to prevent temperature effected errors in the torque of the meter and temperature effected errors at the damping magnets.

In practicing my invention I preferably employ a magnetically permeable body whose permeability falls upon rise in temperature and rises upon decrease in temperature more than the permeability of the damping magnets and the core structure of the torque producing magnet system of the meter. A suitable material is an alloy of iron and nickel suited to the particular meter to be supplied therewith. A suitable alloy for some meters comprises 62½ parts of iron 37½ parts of nickel by weight, commonly known as Guilleaume steel. When a reluctance governing body of such character is employed it is included in the main magnetic circuit of the meter and preferably at the armature gaps by being provided upon the poles of the pressure winding core.

The invention will be more fully explained in connection with the accompanying drawing in which Fig. 1 is a diagrammatic view of one well known form of meter as it is preferably equipped in accordance with my invention, an alternating current system to which the meter is supplied being also diagrammatically shown; and Fig. 2 is a side view of one end of the pressure core with the correcting magnetically permeable body supplied thereto.

I have illustrated transmission mains 1, 2 supplied from a suitable source of current, which, in an alternating current system of distribution, may be the secondary 3 whose primary 4 is shown as being supplied from an alternating current generating dynamo 5. The load illustrated is in the form of incandescent electric lamps 6. The energy consumed by the load is measured by a watt meter, usually of the induction watt hour or integrating type, such a meter being illustrated in the drawing. This meter is inclusive of an upright spindle or shaft 7 suitably held in bearings 8 and 9. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E shaped core of laminated iron 11 whose middle leg is wound by a coil 12 serially included in the main 2. The pressure magnet is inclusive of a U shaped laminated iron core 13 whose legs are surrounded by the coils 14 which are connected in series in the same bridge between the distributing mains 1 and 2. The speed of the armature of the meter is checked by the permanent magnet 15 which embraces the peripheral portion of the disc with which it is in inductive relation. The meter parts illustrated and described constitute a meter motor whose armature 10 and spindle 7 turn proportionately to the wattage in a manner well known to those familiar with the art.

A worm 18 is provided upon the spindle 7 and is in mesh with a spindle 19 that is in driving relation with the counting train of the meter, as is well understood without the necessity of further illustration.

Quadrature relation of the magnetic fields due to the current and pressure windings is effected by means of the closed conductors 20, 20 which surround the ends of the pressure core 13 and are adjustable for calibration along these core ends to regulate the secondary relation of these conductors with the pressure winding 14. The conductors 20, 20 may be in the nature of non-magnetic metallic plates with holes therethrough through which the ends of the core 13 are passed. A non-magnetic metallic plate 21 has two holes formed therethrough through which the ends of core 13 are also passed, to provide closed conductors that compensate for friction. This plate is adjustable for calibration crosswise of the limbs of the core 13.

The temperature effected changes in the torque of the meter are in a direction to assist in the correction of the errors at the damping magnet, but do not proceed far enough. The adjustable reluctance which I employ serves, upon increase in temperature, to reduce the torque producing flux and, upon decrease in temperature, to increase the torque producing flux to an extent to prevent temperature effected errors arising in the motion producing magnet system and also at the motion damping magnet. To this end I preferably place upon either or each end of the pressure core 13 a body of magnetically permeable material 22 which has the property of increasing the reluctance of the main magnetic circuit of the motion producing magnet system upon increase in temperature and of reducing this reluctance upon decrease in temperature whereby the torque is reduced upon increase in temperature and is increased upon reduction in temperature. In other words the magnetic permeability of the bodies 22 falls upon increase in temperature and rises upon reduction in temperature more than the permeability of the core structure of the torque producing magnet system and the damping magnet with the results stated.

Having thus described my invention, I claim:

1. A rotating induction electricity meter including a torque producing magnet system having current and pressure windings, a device responsive to changes in temperature for varying the reluctance encountered by flux set up by said magnet system and serving to reduce the torque effecting flux upon increase in temperature and to increase the torque effecting flux upon reduction in temperature, a closed metallic conductor upon the rotating element of the meter, and a damping magnet whose flux threads this conductor and the permeability of which magnet decreases upon rise of temperature.

2. A rotating induction electricity meter including a torque producing magnet system having current and pressure windings, a device responsive to changes in temperature for varying the reluctance in the circuit of the torque producing flux of the meter set up by said magnet system and serving to increase this reluctance upon increase in temperature and to reduce this reluctance upon decrease in temperature, a closed metallic conductor upon the rotating element of the meter, and a damping magnet whose flux threads this conductor and the permeability of which magnet decreases upon rise of temperature.

3. A rotating induction electricity meter including a torque producing magnet system having current and pressure windings and a magnetic core structure, a body of magnetically permeable material traversed by flux set up by said magnet system and whose permeability varies more upon change in temperature than the permeability of said core structure and serving upon increase in temperature to reduce the torque effecting flux and upon reduction in temperature to increase the torque effecting flux, a closed metallic conductor upon the rotating element of the meter, and a damping magnet whose flux threads this conductor and the permeability of which magnet decreases upon rise of temperature.

4. A rotating induction electricity meter including a torque producing magnet system having current and pressure windings and a magnetic core structure, a body of magnetically permeable material traversed by the torque producing flux set up by said magnet system and whose permeability varies more upon change in temperature than the permeability of said core structure and upon increase in temperature having its permeability reduced more than the permeability of said core structure and upon reduction in temperature to have its permeability increased more than the permeability of said core structure, a closed metallic conductor upon the rotating element of the meter, and a damping magnet whose flux threads this conductor and the permeability of which magnet decreases upon rise of temperature.

5. An electricity meter including a rotating induction motor having a torque producing magnet system provided with inducing torque effecting current and pressure windings and employing a closed metallic conductor upon the rotating element of the motor and a damping magnet in inductive relation to said closed conductor, and a device responsive to changes in temperature for varying the reluctance encountered by flux set up by said magnet system and serving to reduce the torque effecting flux upon increase in temperature and to increase the torque effecting flux upon reduction in temperature, to compensate for temperature effected changes in the dragging action of the damping magnet.

6. An electricity meter including a rotating induction motor having a torque producing magnet system provided with inducing torque effecting current and pressure windings and employing a closed metallic conductor upon the rotating element of the motor and a damping magnet in inductive relation to said closed conductor, and a device responsive to changes in temperature for varying the reluctance in the circuit of the torque producing flux of the meter set up by said magnet system and serving to increase this reluctance upon increase in temperature and to reduce this reluctance upon decrease in temperature, to compensate for temperature effected changes in the dragging action of the damping magnet.

7. An electricity meter including a rotating induction motor having a torque producing magnet system provided with a magnetic core structure and inducing torque effecting current and pressure windings and employing a closed metallic conductor upon the rotating element of the motor and a damping magnet in inductive relation to said closed conductor, and a body of magnetically permeable material traversed by flux set up by said magnet system and whose permeability varies more upon change in temperature than the permeability of said core structure and permanent magnet and serving upon increase in temperature to reduce the torque effecting flux and upon reduction in temperature to increase the torque effecting flux, to compensate for temperature effected changes in the dragging action of the damping magnet.

8. An electricity meter including a rotating induction motor having a torque producing magnet system provided with a magnetic core structure and inducing torque effecting current and pressure windings and employing a closed metallic conductor upon the rotating element of the motor and a damping magnet in inductive relation to said closed conductor, and a body of magnetically permeable material traversed by the torque producing flux set up by said magnet system and whose permeability varies more upon change in temperature than the permeability of said core structure and permanent magnet and upon increase in temperature, having its permeabilty reduced more than the permeability of said core structure and permanent magnet and upon reduction in temperature to have its permeability increased more than the permeability of said core structure and permanent magnet, to compensate for temperature effected changes in the dragging action of the damping magnet.

9. A rotating induction electricity meter including a torque producing magnet system having current and pressure windings, a device responsive to changes in temperature for varying the reluctance in the circuit of the torque producing flux of the meter set up by said magnet system a closed metallic conductor upon the rotating element of the meter, and a damping magnet whose flux threads this conductor and the permeability of which magnet decreases upon rise of temperature.

10. A rotating induction electricity meter including a torque producing magnet system having current and pressure windings and a magnetic core structure, a body of magnetically permeable material traversed by the torque producing flux set up by said magnet system and whose permeability varies more upon change in temperature than the permeability of said core structure, a closed metallic conductor upon the rotating element of the meter, and a damping magnet whose flux threads this conductor and the permeability of which magnet decreases upon rise of temperature.

In witness whereof, I hereunto subscribe my name.

JESSE HARRIS.